United States Patent [19]

Gupta

[11] Patent Number: 5,066,742

[45] Date of Patent: Nov. 19, 1991

[54] MANUFACTURE OF C2-C8 OLEFIN/MALEIC ANHYDRIDE COPOLYMERS

[75] Inventor: Vijai P. Gupta, Berwyn, Pa.

[73] Assignee: ARCO Chemical Technology, Inc., Wilmington, Del.

[21] Appl. No.: 562,765

[22] Filed: Aug. 6, 1990

[51] Int. Cl.$^5$ .............................................. C08F 2/00
[52] U.S. Cl. ................................. 526/216; 526/272; 524/549; 528/499; 528/500
[58] Field of Search ....................... 526/216; 524/549; 528/499, 500

[56] References Cited

U.S. PATENT DOCUMENTS 3,720,651 3/1973 Imoto et al. .................. 260/78.5 R
4,297,483 10/1981 Mejdell et al. ...................... 528/500
4,880,868 11/1989 Le-Khac ............................ 524/549

*Primary Examiner*—Joseph L. Schofer
*Assistant Examiner*—Alex H. Walker
*Attorney, Agent, or Firm*—Dennis M. Kozak

[57] ABSTRACT

A method for producing an aqueous $C_2$–$C_8$ olefin/maleic anhydride copolymer suspension is disclosed. The aqueous copolymer suspension is particularly suitable for use in applications such as fiber spinning syrups in which a copolymer in dry powder form is not needed.

15 Claims, No Drawings

MANUFACTURE OF C2-C8 OLEFIN/MALEIC ANHYDRIDE COPOLYMERS

This invention deals with the manufacture of $C_2$-$C_8$ olefin/ maleic anhydride copolymers.

More specifically, this invention provides a method for producing an aqueous $C_2$-$C_8$ olefin/maleic anhydride copolymer suspension.

The use of precipitation polymerization to produce $C_2$-$C_8$ olefin/maleic anhydride copolymers is well known and has been commercially practiced for many years. For example, U.S. Pat. No. 3,720,651 teaches the manufacture of large uniform $C_4$ olefin/maleic anhydride copolymer particles by precipitation polymerization. While the precipitation polymerization process of U.S. Pat. No. 3,720,651 is well suited to produce copolymers in dry powder form, it requires several copolymer separation steps which add cost to the process and, hence, to the copolymer, regardless of whether the copolymer is needed in dry powder form.

Certain uses of $C_2$-$C_8$ olefin/maleic anhydride copolymers do not require a dry copolymer powder. For example, the manufacture of fibers from isobutylene/maleic anhydride copolymers as described in U.S. Pat. No. 4,880,868 requires that the copolymer be dissolved in an aqueous spinning syrup. In fiber manufacture, paying the added cost associated with recovering the copolymer in dry powder form adds no benefit but significantly increases the manufacturing cost of the fibers.

Accordingly, in uses such as fiber forming, it would be preferable to directly form an aqueous suspension of a $C_2$-$C_8$ olefin/maleic anhydride copolymer without first having to isolate the copolymer as a dry powder only to dissolve the copolymer to form a fiber spinning syrup. Attempts to do so, however, have met with serious problems, including reactor fouling, hydrolysis of various solvents to acids, and difficulty in stripping.

The present invention provides a method for producing an aqueous $C_2$-$C_8$ olefin/maleic anhydride copolymer suspension and, hence, a fiber spinning syrup without having to isolate the copolymer in dry powder form. The problems experienced in earlier attempts to produce the copolymer in solvent systems are solved by this invention. Moreover, the expense associated with the separation steps in precipitation polymerization to form dry powders is avoided.

According to this invention, there is provided a method for producing a $C_2$-$C_8$ olefin/maleic anhydride copolymer. The method comprises the following steps.

In the first step, maleic anhydride and a $C_2$-$C_8$ olefin are polymerized in the presence of a free radical initiator in a blend of a reaction solvent selected from the group consisting of esters of acetic acid, formic acid, and propionic acid and a $C_6$-$C_{12}$ hydrocarbon diluent.

In the next step, the polymerized mixture is distilled to remove substantially all of the reaction solvent and any unreacted maleic anhydride.

Next, a sufficient amount of water is introduced to the remaining polymerized mixture which now contains the $C_2$-$C_8$ olefin/maleic anhydride copolymer, $C_6$-$C_{12}$ hydrocarbon diluent, and catalyst residue to facilitate the removal of the $C_6$-$C_{12}$ hydrocarbon diluent and volatile catalyst residue.

Then, the polymerized mixture containing water is distilled to remove substantially all of the hydrocarbon diluent and volatile catalyst residue, leaving an aqueous $C_2$-$C_8$ olefin/maleic anhydride copolymer suspension. The copolymer can either be recovered from the water or used in the resulting aqueous suspension form.

In one embodiment of this invention, the polymerization reaction between the maleic anhydride and the $C_2$-$C_8$ olefin can be carried out in reaction solvent alone, and the $C_6$ to $C_{12}$ hydrocarbon diluent added later, after the polymerization is completed.

In another embodiment of this invention, unreacted maleic anhydride monomer can be separately removed by a solid-liquid phase separation and solids washing step carried out after the polymerization step, but before the distillation step. However, this step is optional, because the unreacted maleic anhydride monomer is removed, together with the reaction solvent, in the subsequent distillation step.

Any $C_2$-$C_8$ olefin monomer or mixture of monomers can be employed in the practice of this invention. The preferred monomer is isobutylene, or isobutylene blended with minor amounts of other $C_2$-$C_8$ monomers such as hexene-1. For ease of reading and not limitation, this invention will be described in the text using isobutylene as the $C_2$-$C_8$ olefin monomer. In all instances where isobutylene is used it is understood that all other $C_2$-$C_8$ olefins can also be used.

The solvent employed for the copolymerization reaction between isobutylene and maleic anhydride can be a single solvent or a mixture of two or more solvents. The reaction solvent or solvent mixture must exhibit solubility for both the isobutylene and maleic anhydride monomers and insolubility for the isobutylene/maleic anhydride copolymer produced.

Any suitable solvent or mixture of solvents which meets the above-described solubility criteria can be employed in the practice of this invention. Suitable solvents include esters of acetic acid, formic acid, and propionic acid and mixtures of the resulting acetates, formates, and propionates.

Specific examples of solvents usable in this invention are ethyl acetate, isopropyl acetate, ethyl formate, butyl formate, ethyl propionate, and the like and their mixtures. The preferred reaction solvent is isopropyl acetate.

In one embodiment, the polymerization reaction solvent is blended with a $C_6$ to $C_{12}$ hydrocarbon diluent to facilitate distillation of the reaction solvent and any unreacted maleic anhydride monomer. The amount of hydrocarbon diluent added can vary over a wide range of from about 10 to 75 weight percent of the total blend of reaction solvent and diluent.

Notwithstanding the wide range of diluent that can be employed, it is important that it not be employed in an amount which significantly affects the maleic anhydride solubility in the reaction solvent/diluent blend. Particularly suitable $C_6$ to $C_{12}$ hydrocarbon diluents are the $C_6$-$C_{12}$ aliphatic hydrocarbons including hexane, heptane, octane, nonane, decane, undecane, dodecane, and their isomers and mixtures. The preferred blend of reaction solvent and diluent is isopropyl acetate and either octane or undecane.

Any free radical polymerization catalyst can be used to catalyze the polymerization reaction. Suitable catalysts include the VAZO ® azobisisobutyronitrile catalysts commercially available from E. I. DuPont. VAZO-64 and VAZO-67 catalysts were found well-suited for use in this invention at amounts of from about 0.2 to about 2 mole percent or greater based on the amount of maleic anhydride. These amounts are not intended to be limiting in that any catalytically effective amount can be employed.

In the method of this invention, the polymerization reaction is typically conducted at a pressure within the range of from about 10 to about 50 psig and at temperatures within the range of from about 40° to about 100° C., preferably about 55° to about 80° C. Typically, the polymerization reaction will take from 1 to 15 hours.

Any suitable ratio of isobutylene to maleic anhydride can be employed; more than 1 mole equivalent of isobutylene for every mole of maleic anhydride is preferred.

The most preferred mole ratio of isobutylene monomer to maleic anhydride monomer is within the range of from about 1:1 to about 2.5:1.

When the monomers are mixed with the reaction solvent or blend of reaction solvent and diluent, the weight percent of total monomers employed in the reaction solvent or blend of reaction solvent and diluent, will be within the range of 5 to 40%, preferably 10 to 30%, and most preferably 15 to 18%, based on the total weight of monomers, solvent, and diluent.

After completion of the polymerization reaction, the reactor is depressurized; and any excess isobutylene is flared or recovered. Also, at this point, if $C_6$ to $C_{12}$ hydrocarbon diluent has not already been added, a sufficient amount is added to facilitate the removal of reaction solvent and unreacted maleic anhydride by distillation.

If desired, but optional, unreacted maleic anhydride monomer can be separately removed at this point by a solid-liquid phase separation and solids washing step. Alternatively, the unreacted maleic anhydride is removed in the following distillation step.

After polymerization, the polymerized mixture containing the copolymer, reaction solvent, diluent, catalyst residues and unreacted maleic anhydride monomer is distilled to remove substantially all of the reaction solvent and unreacted maleic anhydride monomer (if not already removed). A portion of the diluent may also distill over but sufficient diluent should be retained or added in order to avoid distilling the polymerized mixture to dryness. The mixture should be maintained as a free-flowing liquid throughout the distillation. The distillation temperature will depend on the pressure and the boiling point of the diluent employed. At atmospheric pressure, the distillation temperature will be within the range of from about 65 to about 150° C. After distillation, the remaining polymerized mixture contains substantially no reaction solvent and no unreacted monomers.

Water is then added (or refluxed) to the mixture containing isobutylene/maleic anhydride copolymer, hydrocarbon diluent, and catalyst residues; and azeotropic distillation is begun. Water is continuously added or refluxed as needed until substantially all the hydrocarbon diluent and volatile catalyst residues are removed, leaving the isobutylene/maleic anhydride copolymer in aqueous suspension form. Of course, the copolymer can be recovered in powder form by separation, if desired.

The resulting aqueous copolymer suspension is suitable for use to produce a fiber syrup. For example, the aqueous copolymer suspension can be partially neutralized and spun into superabsorbent fibers using a dry spinning process as taught in U.S. Pat. No. 4,880,868, the teachings of which are incorporated herein by reference.

The following examples further demonstrate the preparation of aqueous isobutylene/maleic anhydride copolymers produced by the method of this invention and the production of fiber spinning syrups and fibers therefrom.

EXAMPLE 1

This example demonstrates the preparation of an aqueous isobutylene/maleic anhydride copolymer suspension by the process of this invention and the preparation of superabsorbent fibers therefrom.

Into a reactor under a nitrogen atmosphere and with agitation were added 4,960 grams of isopropyl acetate, 1,664 grams of hexane, and 845 grams of maleic anhydride.

Next, 570 grams of isobutylene were charged into the reactor and the reactor contents heated and maintained with a temperature range of 62°-65° C.

Next, catalyst (8.1 grams of a 1% solution of VAZO-64 in isopropyl acetate) was slowly charged into the reactor over about a five-hour period and then the temperature of the reactor contents was increased and maintained within a temperature range of 75°-80° C. and held within that range for about 2 hours.

After about 2 hours, the reactor +depressurized. The resulting copolymer precipitate was filtered and washed with additional isopropyl acetate/hexane solution to remove any unreacted maleic anhydride monomer. The washing step was repeated.

Next, 8,490 grams of additional hydrocarbon diluent (ISOPAR-E™, a high purity octane blend from Exxon Chemical Company) were charged into the reactor and the copolymer precipitate was reslurried. The slurry was transferred into a batch distillation kettle and the isopropyl acetate reaction solvent was distilled off.

After distillation, about 10,535 grams of deionized water were added and the ISOPAR-E hydrocarbon diluent was removed by azeotropic distillation, leaving an aqueous isobutylene/maleic anhydride copolymer suspension.

The resulting aqueous polymer suspension was then pumped into a neutralization reactor where 337 grams of sodium hydroxide beads were added at a rate so as to avoid localized boiling. The content of the reactor was maintained at a temperature within the range of from about 90° C. to about 92° C. until a viscous aqueous polymer spinning syrup was formed.

The resulting partially neutralized isobutylene/maleic anhydride copolymer syrup had a solids content of about 12%.

To the resulting syrup was added a cross-linking agent, and the syrup-containing cross-linking agent was concentrated to about 53% solids in preparation for fiber spinning. The 53% solids syrup was then spun using a 6-hold lab spinneret at room temperature. The resulting fibers were cured by heating at about 180° C. for about 12 minutes. The cured fibers were tested and found to be superabsorbent; they possessed a swell index value at atmospheric pressure of 66.2 and at 0.5 psi a value of 44.9. The swell index test method used herein is described in U.S. Pat. No. 4,880,868.

EXAMPLE 2

This example demonstrates the preparation of an aqueous isobutylene-maleic anhydride copolymer suspension by the method of this invention.

Isopropyl acetate (3,720 pounds) and maleic anhydride (682 pounds) were charged into a reactor under a nitrogen atmosphere. After all the maleic anhydride was charged, the reactor was heated to about 150° F. to ensure that all the maleic anhydride was in solution.

Next, the reactor was cooled to 110° F., and ISO-PAR-G ™ isoundecane diluent (1,340 pounds) was charged. The reactor was sealed, pressurized to 30 psig with nitrogen, vented down to 5 psig, and then isobutylene (500 pounds) was charged. A catalyst solution was separately prepared by dissolving VAZO-64 catalyst (7 pounds) in isopropyl acetate (280 pounds) by mixing.

The reactor was then heated to a temperature range within 150°-155° F. and maintained within that range while adding the catalyst solution over a 6-hour period. The reactor temperature was held at the 150°-155° F. range for about one-half hour after the catalyst addition, and then raised to 170°-175° F. and held at the 170°-175° F. range for about 6 hours.

To the resulting polymerization reaction product was added additional ISOPAR-G diluent (1,200 pounds) and distillation at atmospheric pressure was begun and continued until the reactor content contained about 5% by weight isopropyl acetate at a reactor temperature of about 256° F.

Then vacuum distillation was begun and continued until substantially all of the isopropyl acetate and unreacted maleic anhydride distilled out. The reactor temperature was 245° F. and the pressure was 150 mm.

Next, the reactor was cooled, deionized water (4,000 pounds) was added, and azeotropic distillation at atmospheric pressure was begun at a temperature of 209° F. and continued until all ISOPAR-G diluent was distilled off, leaving in the reactor an aqueous isobutylene/maleic anhydride copolymer suspension of this invention.

It will be evident from the foregoing that various modifications can be made to this invention. Such, however, are considered as being within the scope of the invention.

What is claimed is:

1. A method for producing a $C_2$–$C_8$ olefin/maleic anhydride copolymer comprising:
    (a) polymerizing maleic anhydride and a $C_2$–$C_8$ olefin in the presence of a free radical polymerization catalyst in a blend of a reaction solvent selected from the group consisting of esters of acetic acid, formic acid, and propionic acid and a $C_6$ to $C_{12}$ hydrocarbon diluent to form a polymerized mixture;
    (b) distilling the polymerized mixture to remove substantially all of the reaction solvent and any unreacted maleic anhydride;
    (c) adding a sufficient amount of water to the polymerized mixture containing the $C_2$–$C_8$ olefin/maleic anhydride copolymer, hydrocarbon diluent, and catalyst residue to facilitate the removal of the hydrocarbon diluent and volatile catalyst residue; and
    (d) distilling to remove substantially all of the hydrocarbon diluent and volatile catalyst residue and to provide an aqueous $C_2$–$C_8$ olefin/maleic anhydride copolymer suspension.

2. The method of claim 1 in which after step (a) and before step (b) unreacted maleic anhydride is removed by a solid-liquid phase separation step.

3. The method of claim 1 in which in step (a), the polymerization is carried out in the absence of the $C_6$–$C_{12}$ hydrocarbon diluent which is added after polymerization but before distillation (step b).

4. The method of claim 1 in which in step (a), the ratio of $C_2$–$C_8$ olefin monomer to maleic anhydride monomer is more than 1 mole equivalent of $C_2$–$C_8$ olefin for every mole of maleic anhydride.

5. The method of claim 1 in which in step (a), the ratio of $C_2$–$C_8$ olefin monomer to maleic anhydride monomer is within the range of from about 1:1 to about 2.5:1.

6. The method of claim 1 in which the $C_2$ to $C_8$ olefin is isobutylene.

7. The method of claim 1 in which the $C_2$ to $C_8$ olefin is a blend of isobutylene and at least one other $C_2$ to $C_8$ olefin.

8. The method of claim 7 in which said other $C_2$ to $C_8$ olefin is hexene-1.

9. The method of claim 1 in which in step (a), said reaction solvent is isopropyl acetate.

10. A method for producing an isobutylene/maleic anhydride copolymer comprising:
    (a) polymerizing maleic anhydride and isobutylene in the presence of a free radical polymerization catalyst in a blend of a reaction solvent selected from the group consisting of esters of acetic acid, formic acid, and propionic acid and a $C_6$ to $C_{12}$ hydrocarbon diluent to form a polymerized mixture;
    (b) distilling the polymerized mixture to remove substantially all of the reaction solvent and any unreacted maleic anhydride;
    (c) adding a sufficient amount of water to the polymerized mixture containing the isobutylene/maleic anhydride copolymer, hydrocarbon diluent, and catalyst residue to facilitate the removal of the hydrocarbon diluent and volatile catalyst residue; and
    (d) distilling to remove substantially all of the hydrocarbon diluent and volatile catalyst residue and to provide an aqueous isobutylene/maleic anhydride copolymer suspension.

11. The method of claim 10 in which after step (a) and before step (b) unreacted maleic anhydride is removed by a solid-liquid phase separation step.

12. The method of claim 10 in which in step (a), the polymerization is carried out in the absence of the $C_6$–$C_{12}$ hydrocarbon diluent which is added after polymerization but before distillation step (b).

13. The method of claim 10 in which in step (a), the ratio of isobutylene monomer to maleic anhydride monomer is more than 1 mole equivalent of isobutylene for every mole of maleic anhydride.

14. The method of claim 10 in which in step (a), the ratio of isobutylene monomer to maleic anhydride monomer is within the range of from about 1:1 to about 2.5:1.

15. The method of claim 10 in which in step (a), said reaction solvent is isopropyl acetate.

* * * * *